United States Patent
McMurdie et al.

(10) Patent No.: US 7,749,368 B2
(45) Date of Patent: Jul. 6, 2010

(54) METHODS FOR COATING A METAL SUBSTRATE AND RELATED COATED SUBSTRATES

(75) Inventors: Neil D. McMurdie, Butler, PA (US); Mark W. McMillen, Cabot, PA (US); Edward F. Rakiewicz, Gibsonia, PA (US); Michelle S. Miles, Mercer, PA (US); Richard F. Karabin, Ruffs Dale, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 651 days.

(21) Appl. No.: 11/610,073

(22) Filed: Dec. 13, 2006

(65) Prior Publication Data

US 2008/0145678 A1 Jun. 19, 2008

(51) Int. Cl.
*C25D 13/10* (2006.01)
(52) U.S. Cl. .................. 204/486; 204/506; 148/247
(58) Field of Classification Search ............... 204/486, 204/506; 148/247
See application file for complete search history.

(56) References Cited

U.S. PATENT DOCUMENTS

| | | | |
|---|---|---|---|
| 6,168,868 B1 | 1/2001 | Hauser et al. | 428/457 |
| 6,190,525 B1 | 2/2001 | Karabin et al. | 204/489 |
| 6,217,674 B1 | 4/2001 | Gray et al. | 148/247 |
| 6,312,812 B1 | 11/2001 | Hauser et al. | 428/412 |
| 6,761,933 B2 | 7/2004 | Warburton et al. | 427/410 |
| 6,777,034 B2 | 8/2004 | Berger et al. | 427/410 |
| 6,905,590 B2 | 6/2005 | Nojiri et al. | 205/317 |
| 7,510,612 B2 * | 3/2009 | Matsukawa et al. | 148/247 |
| 2004/0163735 A1 | 8/2004 | Matsukawa et al. | 148/247 |

FOREIGN PATENT DOCUMENTS

| | | |
|---|---|---|
| WO | WO 00/64991 A1 | 11/2000 |
| WO | WO 01/46495 A2 | 6/2001 |

\* cited by examiner

*Primary Examiner*—Kishor Mayekar
(74) *Attorney, Agent, or Firm*—Donald R. Palladino

(57) ABSTRACT

Disclosed are methods for coating a metal substrate with a yttrium-containing coating, including ferrous substrates, such as cold rolled steel and electrogalvanized steel. Also disclosed are coated substrates produced thereby.

13 Claims, No Drawings

METHODS FOR COATING A METAL SUBSTRATE AND RELATED COATED SUBSTRATES

FIELD OF THE INVENTION

The present invention relates to methods for applying a yttrium-containing coating to a metal substrate, including ferrous substrates, such as cold rolled steel and electrogalvanized steel. The present invention also relates to the coated substrates produced thereby.

BACKGROUND INFORMATION

Pretreating metal substrates with phosphate conversion coatings and chrome-containing rinses has long been conventional for promoting corrosion resistance. To maximize corrosion resistance over steel substrates, cationic electrodeposition compositions are often formulated with lead as either a pigment or a soluble lead salt and are applied over pretreated (phosphated and chrome rinsed) substrates. Disadvantages associated with phosphating include the amount of plant space required for processing due to multiple (usually eleven to twenty-five) stages; high capital cost; and generation of waste streams containing heavy metals, requiring expensive treatment and disposal. Additionally, lead and chromium used in the electrodepositable composition can cause environmental concerns. The lead may be present in the effluent from electrodeposition processes and chromium may be present in the effluent from pretreatment processes, and these metals need to be removed and disposed of safely, which again requires expensive waste treatment processes.

To alleviate at least some of the foregoing disadvantages, alternative, non-phosphate based pretreatment compositions have been developed. For example, pretreatment compositions based on a group IIIB and/or IVB metal compound have recently become more prevalent. In addition, lead-free electrodepositable compositions containing yttrium have been developed that improve the corrosion resistance of the electrocoated metal substrate, particularly when the metal substrate is untreated. It is believed, however, that pretreatment compositions based on a group IIIB and/or IVB metal compound and lead-free electrodepositable compositions containing yttrium have not been used in combination.

As a result, it would be desirable to provide a method for providing a yttrium-containing coating on a substrate that utilizes a pretreatment composition based on a group IIIB or IVB metal compound. More particularly, it would be desirable to provide such a method wherein the resulting coating system, in at least some cases, exhibits excellent adhesion properties between the pretreatment composition and the yttrium-containing coating.

SUMMARY OF THE INVENTION

In certain respects, the present invention is directed to methods for coating a metal substrate. These methods comprise (a) contacting at least a portion of the metal substrate with a pretreatment composition comprising (i) a source of a group IIIB metal and/or a group IVB metal, and (ii) a source of copper; and then (b) contacting at least a portion of the metal substrate with a composition comprising (i) a film-forming resin, and (ii) a source of yttrium.

In other respects, the present invention is directed to methods for coating a metal substrate that comprise (a) contacting at least a portion of the metal substrate with a pretreatment composition comprising (i) a source of a group IIIB metal and/or a group IVB metal; and (ii) a source of copper; and then (b) electrocoating at least a portion of the metal substrate with a curable electrodepositable coating composition comprising (i) a film-forming resin, and (ii) a source of yttrium.

The present invention is also related to coated metal substrates. These substrates comprise: (a) a pretreatment coating formed from a pretreatment composition comprising (i) a source of a group IIIB metal and/or a group IVB metal; and (ii) a source of copper; and (b) a coating deposited upon at least a portion of the pretreatment coating that is formed from a composition comprising (i) a film-forming resin and (ii) a source of yttrium.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to methods for coating a metal substrate. Suitable metal substrates for use in the present invention include those that are often used in the assembly of automotive bodies, automotive parts, and other articles, such as small metal parts, including fasteners, i.e., nuts, bolts, screws, pins, nails, clips, buttons, and the like. Specific examples of suitable metal substrates include, but are not limited to, cold rolled steel, hot rolled steel, steel coated with zinc metal, zinc compounds, or zinc alloys, such as electrogalvanized steel, hot-dipped galvanized steel, galvanealed steel, and steel plated with zinc alloy. Also, aluminum alloys, aluminum plated steel and aluminum alloy plated steel substrates may be used. Other suitable non-ferrous metals include copper and magnesium, as well as alloys of these materials. Moreover, the bare metal substrate being coating by the methods of the present invention may be a cut edge of a substrate that is otherwise treated and/or coated over the rest of its surface. The metal substrate coated in accordance with the methods of the present invention may be in the form of, for example, a sheet of metal or a fabricated part.

The substrate to be coated in accordance with the methods of the present invention may first be cleaned to remove grease, dirt, or other extraneous matter. This is often done by employing mild or strong alkaline cleaners, such as are commercially available and conventionally used in metal pretreatment processes. Examples of alkaline cleaners suitable for use in the present invention include Chemkleen 163 and Chemkleen 177, both of which are commercially available from PPG Industries, Inc. Such cleaners are often followed and/or preceded by a water rinse.

In certain embodiments, the metal substrate is rinsed with an aqueous acidic solution after cleaning with an alkaline cleaner and before contact with a pretreatment composition. Examples of rinse solutions include mild or strong acidic cleaners, such as dilute nitric acid solutions commercially available and conventionally used in metal pretreatment processes.

In the methods of the present invention, the metal substrate is contacted with a pretreatment composition comprising (i) a source of a group IIIB metal and/or a group IVB metal, and (ii) a source of copper. As used herein, the term "pretreatment composition" refers to a composition that chemically alters the surface of a bare metal substrate prior to coating the substrate with a composition comprising a film-forming resin and yttrium source. Such a pretreatment composition typically comprises a carrier, often an aqueous medium, so that the composition is in the form of a solution or dispersion of the source of the group IIIB metal and/or group IVB metal and the source of copper in the carrier. The solution or dispersion may be brought into contact with the substrate by any of a variety of known techniques, such as dipping or immersion, spraying, intermittent spraying, dipping followed by spraying, spraying followed by dipping, brushing, or roll-coating. In certain embodiments, the solution or dispersion when applied to the metal substrate is at a temperature ranging from 60 to 150° F. (15 to 65° C.). The contact time is often from 10 seconds to five minutes, such as 30 seconds to 2 minutes.

As used herein, the terms "group IIIB metal" and "group IVB metal" refer to the elements that are in group IIIB and group IVB of the CAS Periodic Table of the Elements as is shown, for example, in the Handbook of Chemistry and Physics, $63^{rd}$ edition (1983). In certain embodiments, the source of the group IIIB metal and/or the group IV metal in the pretreatment composition is the metal itself. In certain embodiments, a group IIIB and/or group IVB metal compound is used as the source of the group IIIB and/or IVB metal. As used herein, the term "group IIIB and/or group IVB metal compound" refers to compounds that include at least one element that is in group IIIB or group IVB of the CAS Periodic Table of the Elements.

In certain embodiments, the group IIIB and/or group IVB metal compound used in the pretreatment composition is a compound of zirconium, titanium, hafnium, yttrium, cerium, or a mixture thereof. Suitable compounds of zirconium include, but are not limited to, hexafluorozirconic acid, alkali metal and ammonium salts thereof, ammonium zirconium carbonate, zirconyl nitrate, zirconium carboxylates and zirconium hydroxy carboxylates, such as hydrofluorozirconic acid, zirconium acetate, zirconium oxalate, ammonium zirconium glycolate, ammonium zirconium lactate, ammonium zirconium citrate, and mixtures thereof. Suitable compounds of titanium include, but are not limited to, fluorotitanic acid and its salts. A suitable compound of hafnium includes, but is not limited to, hafnium nitrate. A suitable compound of yttrium includes, but is not limited to, yttrium nitrate. A suitable compound of cerium includes, but is not limited to, cerous nitrate.

In certain embodiments, the group IIIB and/or group IVB metal compound is present in the pretreatment composition in an amount of 10 to 5000 parts per million ("ppm") metal, such as 100 to 300 ppm metal, based on the total weight of the ingredients in the composition. The pH of the pretreatment composition often ranges from 2.0 to 7.0, such as 3.5 to 5.5. The pH of the pretreatment composition may be adjusted using mineral acids, such as hydrofluoric acid, fluoroboric acid, phosphoric acid, and the like, including mixtures thereof; organic acids, such as lactic acid, acetic acid, citric acid, or mixtures thereof; and water soluble or water dispersible bases, such as sodium hydroxide, ammonium hydroxide, ammonia, or amines, such as triethylamine, methylethyl amine, diisopropanolamine, or a mixture thereof.

As previously indicated, in the methods of the present invention, the pretreatment composition also comprises a source of copper. Indeed, while the inclusion of copper in pretreatment compositions comprising a group IIIB metal and/or a group IVB metal has been known to at least marginally improve the corrosion resisting properties of such compositions and, perhaps, marginally improve the ability of such compositions to adhere to a metal substrate, a surprising discovery of the present invention is that the inclusion of copper in the pretreatment compositions described herein, when used in combination with a coating composition comprising yttrium, as described below, results in a coating system exhibiting, in at least some cases, far superior adhesion properties between the pretreatment composition and the yttrium-containing coating as compared to a similar coating system wherein copper is not present in the pretreatment composition.

Both soluble and insoluble compounds may serve as the source of copper in the pretreatment compositions used in the present invention. For example, in certain embodiments, the supplying source of copper ions in the pretreatment composition is a water soluble copper compound. Specific examples of such materials include, but are not limited to, copper cyanide, copper potassium cyanide, copper sulfate, copper nitrate, copper pyrophosphate, copper thiocyanate, disodium copper ethylenediaminetetraacetate tetrahydrate, copper bromide, copper oxide, copper hydroxide, copper chloride, copper fluoride, copper gluconate, copper citrate, copper lauroyl sarcosinate, copper formate, copper acetate, copper propionate, copper butyrate, copper lactate, copper oxalate, copper phytate, copper tartarate, copper malate, copper succinate, copper malonate, copper maleate, copper benzoate, copper salicylate, copper aspartate, copper glutamate, copper fumarate, copper glycerophosphate, sodium copper chlorophyllin, copper fluorosilicate, copper fluoroborate and copper iodate, as well as copper salts of carboxylic acids in the homologous series formic acid to decanoic acid, copper salts of polybasic acids in the series oxalic acid to suberic acid, and copper salts of hydroxycarboxylic acids, including glycolic, lactic, tartaric, malic and citric acids.

When copper ions supplied from such a water-soluble copper compound are precipitated as an impurity in the form of copper sulfate, copper oxide, etc., it may be desirable to add a complexing agent that suppresses the precipitation of copper ions, thus stabilizing them as a copper complex in the solution.

In certain embodiments, the copper compound is added as a copper complex salt such as $K_3Cu(CN)_4$ or Cu-EDTA, which can be present stably in the pretreatment composition on its own, but it is also possible to form a copper complex that can be present stably in the pretreatment composition by combining a complexing agent with a compound that is difficultly soluble on its own. Examples thereof include a copper cyanide complex formed by a combination of CuCN and KCN or a combination of CuSCN and KSCN or KCN, and a Cu-EDTA complex formed by a combination of $CuSO_4$ and EDTA.2Na.

With regard to the complexing agent, a compound that can form a complex with copper ions can be used; examples thereof include inorganic compounds such as cyanide compounds and thiocyanate compounds, and polycarboxylic acids, and specific examples thereof include ethylenediaminetetraacetic acid, salts of ethylenediaminetetraacetic acid such as dihydrogen disodium ethylenediaminetetraacetate dihydrate, aminocarboxylic acids such as nitrilotriacetic acid and iminodiacetic acid, oxycarboxylic acids such as citric acid and tartaric acid, succinic acid, oxalic acid, ethylenediaminetetramethylenephosphonic acid, and glycine.

In certain embodiments, copper is included in such pretreatment compositions in an amount from 1 to 5,000, such as 1 to 500, or, in some cases, 1 to 50 ppm of total copper (measured as elemental copper), based on the total weight of the ingredients in the composition.

In certain embodiments, the pretreatment composition also comprises a resinous binder. Suitable resins include reaction products of one or more alkanolamines and an epoxy-functional material containing at least two epoxy groups, such as those disclosed in U.S. Pat. No. 5,653,823. In some cases, such resins contain beta hydroxy ester, imide, or sulfide functionality, incorporated by using dimethylolpropionic acid, phthalimide, or mercaptoglycerine as an additional reactant in the preparation of the resin. Alternatively, the reaction product is that of the diglycidyl ether of Bisphenol A (commercially available from Shell Chemical Company as EPON 880), dimethylol propionic acid, and diethanolamine in a 0.6 to 5.0:0.05 to 5.5:1 mole ratio. Other suitable resinous binders include water soluble and water dispersible polyacrylic acids as disclosed in U.S. Pat. Nos. 3,912,548 and 5,328,525; phenol formaldehyde resins as described in U.S. Pat. No. 5,662,746; water soluble polyamides such as those disclosed in WO 95/33869; copolymers of maleic or acrylic acid with allyl ether as described in Canadian patent application 2,087,352; and water soluble and dispersible resins including epoxy resins, aminoplasts, phenol-formaldehyde resins, tannins, and polyvinyl phenols as discussed in U.S. Pat. No. 5,449,415.

In these embodiments of the present invention, the resinous binder is often present in the pretreatment composition in an amount of 0.005 percent to 30 percent by weight, such as 0.5 to 3 percent by weight, based on the total weight of the ingredients in the composition.

In other embodiments, however, the pretreatment composition is substantially free or, in some cases, completely free of any resinous binder. As used herein, the term "substantially free", when used with reference to the absence of resinous binder in the pretreatment composition, means that any resinous binder is present in the pretreatment composition in an amount of less than 0.005 percent by weight. As used herein, the term "completely free" means that there is no resinous binder in the pretreatment composition at all.

The pretreatment composition may optionally contain other materials such as nonionic surfactants and auxiliaries conventionally used in the art of pretreatment. In an aqueous medium, water dispersible organic solvents, for example, alcohols with up to about 8 carbon atoms such as methanol, isopropanol, and the like, may be present; or glycol ethers such as the monoalkyl ethers of ethylene glycol, diethylene glycol, or propylene glycol, and the like. When present, water dispersible organic solvents are typically used in amounts up to about ten percent by volume, based on the total volume of aqueous medium.

Other optional materials include surfactants that function as defoamers or substrate wetting agents. Anionic, cationic, amphoteric, and/or nonionic surfactants may be used. Defoaming surfactants are often present at levels up to 1 percent, such as up to 0.1 percent by volume, and wetting agents are typically present at levels up to 2 percent, such as up to 0.5 percent by volume, based on the total volume of medium.

In certain embodiments, the pretreatment composition also comprises a silane, such as, for example, an amino group-containing silane coupling agent, a hydrolysate thereof, or a polymer thereof, as described in United States Patent Application Publication No. 2004/0163736 A1 at [0025] to [0031], the cited portion of which being incorporated herein by reference. In other embodiments of the present invention, however, the pretreatment composition is substantially free, or, in some cases, completely free of any such amino group-containing silane coupling agent. As used herein, the term "substantially free", when used with reference to the absence of amino-group containing silane coupling agent in the pretreatment composition, means that any amino-group containing silane coupling agent, hydrolysate thereof, or polymer thereof that is present in the pretreatment composition is present in an amount of less than 5 ppm. As used herein, the term "completely free" means that there is no amino-group containing silane coupling agent, hydrolysate thereof, or polymer thereof in the pretreatment composition at all.

In certain embodiments, the pretreatment composition also comprises a reaction accelerator, such as nitrite ions, nitro-group containing compounds, hydroxylamine sulfate, persulfate ions, sulfite ions, hyposulfite ions, peroxides, iron (III) ions, citric acid iron compounds, bromate ions, perchlorinate ions, chlorate ions, chlorite ions as well as ascorbic acid, citric acid, tartaric acid, malonic acid, succinic acid and salts thereof. Specific examples of suitable materials and their amounts are described in United States Patent Application Publication No. 2004/0163736 A1 at [0032] to [0041], the cited portion of which being incorporated herein by reference.

In certain embodiments, the pretreatment composition also includes a source of phosphate ions. In other embodiments, however, the pretreatment composition is substantially or, in some cases, completely free of phosphate ions. As used herein, the term "substantially free" when used in reference to the absence of phosphate ions in the pretreatment composition, means that phosphate ions are not present in the composition to such an extent that the phosphate ions cause a burden on the environment. That is, phosphate ions are not substantially used and the formation of sludge, such as iron phosphate and zinc phosphate, formed in the case of using a treating agent based on zinc phosphate, is eliminated.

In certain embodiments, the film coverage of the residue of the pretreatment coating composition generally ranges from 1 to 1000 milligrams per square meter ($mg/m^2$), such as 10 to 400 $mg/m^2$. The thickness of the pretreatment coating can vary, but is generally less than 1 micrometer, in some cases it is from 1 to 500 nanometers, and, in yet other cases, it is 10 to 300 nanometers.

After contact with the pretreatment composition the substrate may be rinsed with water and coated directly; i.e., without a phosphating step as is conventional in the art. Such coating may be done immediately or after a drying period at ambient or elevated temperature conditions.

As indicated, in the methods of the present invention, after the substrate is contacted with the pretreatment composition, it is then contacted with a composition comprising (i) a film-forming resin, and (ii) a source of yttrium. In certain embodiments, such contacting comprises an electrocoating step wherein an electrodepositable composition is deposited onto the metal substrate by electrodeposition.

In the process of electrodeposition, the metal substrate being treated, serving as an electrode, and an electrically conductive counter electrode are placed in contact with an ionic, electrodepositable composition. Upon passage of an electric current between the electrode and counter electrode while they are in contact with the electrodepositable composition, an adherent film of the electrodepositable composition will deposit in a substantially continuous manner on the metal substrate.

Electrodeposition is usually carried out at a constant voltage in the range of from 1 volt to several thousand volts, typically between 50 and 500 volts. Current density is usually between 1.0 ampere and 15 amperes per square foot (10.8 to 161.5 amperes per square meter) and tends to decrease quickly during the electrodeposition process, indicating formation of a continuous self-insulating film.

The electrodepositable composition utilized in certain embodiments of the present invention often comprises a resinous phase dispersed in an aqueous medium wherein the resinous phase comprises: (a) an active hydrogen group-containing ionic electrodepositable resin, and (b) a curing agent having functional groups reactive with the active hydrogen groups of (a).

In certain embodiments, the electrodepositable compositions utilized in certain embodiments of the present invention contain, as a main film-forming polymer, an active hydrogen-containing ionic, often cationic, electrodepositable resin. A wide variety of electrodepositable film-forming resins are known and can be used in the present invention so long as the polymers are "water dispersible," i.e., adapted to be solubilized, dispersed or emulsified in water. The water dispersible polymer is ionic in nature, that is, the polymer will contain anionic functional groups to impart a negative charge or, as is often the case, cationic functional groups to impart a positive charge.

Examples of film-forming resins suitable for use in anionic electrodepositable compositions are base-solubilized, carboxylic acid containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable electrodepositable film-forming resin comprises an alkyd-aminoplast vehicle, i.e., a vehicle containing an alkyd resin and an amine-aldehyde resin. Yet another anionic electrodepositable resin composition comprises mixed esters of a resinous polyol. These compositions are described in detail in U.S. Pat. No. 3,749,657 at col. 9, lines 1 to 75 and col. 10, lines 1 to 13, the cited portion of which being incorporated herein by reference. Other acid functional polymers can also be used such as phosphatized polyepoxide or phosphatized acrylic polymers as are well known to those skilled in the art.

As aforementioned, it is often desirable that the active hydrogen-containing ionic electrodepositable resin is cationic and capable of deposition on a cathode. Examples of such cationic film-forming resins include amine salt group-containing resins such as the acid-solubilized reaction products of polyepoxides and primary or secondary amines such as those described in U.S. Pat. Nos. 3,663,389; 3,984,299; 3,947,338; and 3,947,339. Often, these amine salt group-containing resins are used in combination with a blocked isocyanate curing agent. The isocyanate can be fully blocked as described in U.S. Pat. No. 3,984,299 or the isocyanate can be partially blocked and reacted with the resin backbone, such as is described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins, such as those described in U.S. Pat. Nos. 3,455,806 and 3,928,157.

Besides amine salt group-containing resins, quaternary ammonium salt group-containing resins can also be employed. Examples of these resins are those which are formed from reacting an organic polyepoxide with a tertiary amine salt. Such resins are described in U.S. Pat. Nos. 3,962,165; 3,975,346; and 4,001,101. Examples of other cationic resins are ternary sulfonium salt group-containing resins and quaternary phosphonium salt-group containing resins, such as those described in U.S. Pat. Nos. 3,793,278 and 3,984,922, respectively. Also, film-forming resins which cure via transesterification, such as described in European Application No. 12463 can be used. Further, cationic compositions prepared from Mannich bases, such as described in U.S. Pat. No. 4,134,932 can be used.

In certain embodiments, the resins present in the electrodepositable composition are positively charged resins which contain primary and/or secondary amine groups. Such resins are described in U.S. Pat. Nos. 3,663,389; 3,947,339; and 4,116,900. In U.S. Pat. No. 3,947,339, a polyketimine derivative of a polyamine, such as diethylenetriamine or triethylenetetraamine is reacted with a polyepoxide. When the reaction product is neutralized with acid and dispersed in water, free primary amine groups are generated. Also, equivalent products are formed when polyepoxide is reacted with excess polyamines, such as diethylenetriamine and triethylenetetraamine and the excess polyamine vacuum stripped from the reaction mixture. Such products are described in U.S. Pat. Nos. 3,663,389 and 4,116,900.

In certain embodiments, the active hydrogen-containing ionic electrodepositable resin described above is present in the electrodepositable composition in an amount of 1 to 60 percent by weight, such as 5 to 25 percent by weight, based on total weight of the electrodeposition bath.

As indicated, the resinous phase of the electrodepositable composition often further comprises a curing agent adapted to react with the active hydrogen groups of the ionic electrodepositable resin described immediately above. For example, both blocked organic polyisocyanate and aminoplast curing agents are suitable for use in the present invention, although blocked isocyanates are often preferred herein for cathodic electrodeposition.

Aminoplast resins, which are often the preferred curing agent for anionic electrodeposition, are the condensation products of amines or amides with aldehydes. Examples of suitable amine or amides are melamine, benzoguanamine, urea and similar compounds. Generally, the aldehyde employed is formaldehyde, although products can be made from other aldehydes such as acetaldehyde and furfural. The condensation products contain methylol groups or similar alkylol groups depending on the particular aldehyde employed. These methylol groups are often etherified by reaction with an alcohol. Various alcohols employed include monohydric alcohols containing from 1 to 4 carbon atoms such as methanol, ethanol, isopropanol, and n-butanol, with methanol being preferred.

The aminoplast curing agents are often utilized in conjunction with the active hydrogen containing anionic electrodepositable resin in amounts ranging from 5 percent to 60 percent by weight, such as from 20 percent to 40 percent by weight, the percentages based on the total weight of the resin solids in the electrodepositable composition.

As indicated, the curing agents used in cathodic electrodeposition are often blocked organic polyisocyanates. The polyisocyanates can be fully blocked as described in U.S. Pat. No. 3,984,299 at col. 1, lines 1 to 68, col. 2, and col. 3, lines 1 to 15, or partially blocked and reacted with the polymer backbone as described in U.S. Pat. No. 3,947,338 at col. 2, lines 65 to 68, col. 3, and col. 4 lines 1 to 30, the cited portions of both of which being incorporated herein by reference. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates, such as triisocyanates can be used. An example would include triphenylmethane-4,4',4"-triisocyanate. Isocyanate prepolymers with polyols, such as neopentyl glycol and trimethylolpropane, and with polymeric polyols, such as polycaprolactone diols and triols (NCO/OH equivalent ratio greater than 1) can also be used.

The polyisocyanate curing agents are often utilized in conjunction with the active hydrogen containing cationic electrodepositable resin in amounts ranging from 5 percent to 60 percent by weight, such as from 20 percent to 50 percent by weight, the percentages based on the total weight of the resin solids of the electrodepositable composition.

As previously indicated, in the methods of the present invention, the coating composition, such as an electrodepositable composition, also comprises a source of yttrium. In certain embodiments, yttrium is present in such compositions in an amount from 10 to 10,000 ppm, such as not more than 5,000 ppm, and, in some cases, not more than 1,000 ppm, of total yttrium (measured as elemental yttrium), based on the total weight of the ingredients in the composition.

Both soluble and insoluble yttrium compounds may serve as the source of yttrium. Examples of yttrium sources suitable for use in lead-free electrodepositable coating compositions are soluble organic and inorganic yttrium salts such as yttrium acetate, yttrium chloride, yttrium formate, yttrium carbonate, yttrium sulfamate, yttrium lactate and yttrium nitrate. When the yttrium is to be added to an electrocoat bath as an aqueous solution, yttrium nitrate, a readily available yttrium compound, is a preferred yttrium source. Other yttrium compounds suitable for use in the present invention are organic and inorganic yttrium compounds, such as yttrium oxide, yttrium bromide, yttrium hydroxide, yttrium molybdate, yttrium sulfate, yttrium silicate, and yttrium oxalate. Organoyttrium complexes and yttrium metal can also be used. When the yttrium is to be incorporated into an electrocoat bath as a component in a pigment paste, yttrium oxide may be a preferred source of yttrium.

The electrodepositable compositions described herein are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, often less than 0.15 micron.

The concentration of the resinous phase in the aqueous medium is often at least 1 percent by weight, such as from 2 to 60 percent by weight, based on total weight of the aqueous dispersion. When such compositions are in the form of resin concentrates, they generally have a resin solids content of 20 to 60 percent by weight based on weight of the aqueous dispersion.

The electrodepositable compositions described herein are typically supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents.

There are various methods by which the yttrium compound can be incorporated into the electrodepositable composition. A soluble yttrium compound may be added "neat," that is, added directly to the bath without prior blending or reacting with other components. Alternatively, a soluble yttrium compound can be added to the predispersed clear resin feed which may include the ionic resin, the curing agent and/or any other non-pigmented component. In certain embodiments, a soluble yttrium compound is added "neat" to the electrodeposition bath. Insoluble yttrium compounds and/or yttrium pigments, on the other hand, are often pre-blended with the pigment paste component prior to the incorporation of the paste to the electrodeposition bath.

In certain embodiments, the electrodepositable compositions described herein contain yttrium as a sole corrosion inhibiting inorganic component. In other embodiments, however, yttrium is supplemented with other corrosion inhibiting inorganic or organic components such as calcium, bismuth or polyphenols such as phenol functional polymers. In certain embodiments, however, such electrodepositable compositions are substantially or completely free of lead. As used herein, the term "substantially free" when used in reference to the absence of lead in the coating composition comprising yttrium means that lead is not present in the composition to such an extent that it would cause a burden on the environment.

In certain embodiments, the electrodepositable composition has a resin solids content within the range of 5 to 25 percent by weight based on total weight of the composition.

As aforementioned, besides water, the aqueous medium may contain a coalescing solvent. Useful coalescing solvents include, for example, hydrocarbons, alcohols, esters, ethers and ketones. The preferred coalescing solvents are often alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between 0.01 and 25 percent, such as from 0.05 to 5 percent by weight based on total weight of the aqueous medium.

In addition, a colorant and, if desired, various additives such as surfactants, wetting agents or catalyst can be included in the electrodepositable composition. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, when pigment is employed, the pigment-to-resin ratio is within the range of 0.02 to 1:1. The other additives mentioned above are often present in amounts of 0.01 to 3 percent by weight based on weight of resin solids.

After electrodeposition, the coating is often heated to cure the deposited composition. The heating or curing operation is often carried out at a temperature in the range of from 120 to 250° C., such as from 120 to 190° C., for a period of time ranging from 10 to 60 minutes. In certain embodiments, the thickness of the resultant film is from 10 to 50 microns.

As will be appreciated by the foregoing description, the present invention is also directed to methods for coating a metal substrate that comprise: (a) contacting at least a portion of the metal substrate with a pretreatment composition comprising (i) a source of a group IIIB metal and/or a group IVB metal; and (ii) a source of copper; and then (b) electrocoating at least a portion of the metal substrate with a curable electrodepositable coating composition comprising (i) a film-forming resin, and (ii) a source of yttrium.

In addition, as will be appreciated, the present invention is also related to coated metal substrates comprising: (a) a pretreatment coating formed from a pretreatment composition comprising (i) a source of a group IIIB metal and/or a group IVB metal; and (ii) a source of copper; and (b) a coating deposited upon at least a portion of the pretreatment coating that is formed from a composition comprising (i) a film-forming resin and (ii) a source of yttrium.

Illustrating the invention are the following examples that are not to be considered as limiting the invention to their details. All parts and percentages in the examples, as well as throughout the specification, are by weight unless otherwise indicated.

EXAMPLE 1

Four cold rolled steel (CRS) panels were cleaned by spraying with a solution of Chemkleen 490MX, an alkaline cleaner available from PPG Industries, for two minutes at 120° F.

After alkaline cleaning, the panels were rinsed thoroughly with deionized water. Two of these panels were then dried with a warm air blowoff. The other two panels were immersed in a zirconium pretreatment solution for one minute at ambient temperature. The zirconium pretreatment solution was prepared by diluting hexafluorozirconic acid with water to a zirconium concentration of 175 ppm (as zirconium) and adjusting the pH to 4.5 with dilute ammonia. After pretreatment in the zirconium pretreatment solution, the panels were rinsed thoroughly with deionized water and then dried with a warm air blowoff. One cleaned-only panel and one zirconium-pretreated panel were then coated with ED 6100H, a cathodic electrocoat available from PPG Industries that does not contain yttrium. The ED 6100 H coating bath was prepared and coated according to the manufacturer's instructions. The other two panels were likewise coated with ED 6100H, but in this case 200 ppm of soluble yttrium as the sulfamic acid salt were added to the ED 6100 H bath. Both panel sets were cured according to the manufacturer's specifications.

After curing, the panels were tested for coating adhesion using an instrument called Pneumatic Adhesion Tensile Testing Instrument or PATTI®, made by Elcometer. The instrument determines the amount of force (in psi) required to cause adhesion failure. The test is conducted as follows: 1) glue an aluminum "stub" to the coated surface; 2) wait 24 hours for the glue to cure; 3) apply a tensile force to the stub until adhesion failure is observed; and 4) record the pressure that was required to cause failure (burst pressure). After this first adhesion test, coated panels were exposed to condensing humidity at 140° F. for 16 hours. The PATTI test was then run on the exposed panels. The adhesion results before and after humidity exposure are summarized in Table I below.

TABLE I

| Pretreatment | Yttrium in electrocoat | Average PATTI burst pressure, psi | |
|---|---|---|---|
| | | Before humidity exposure | After humidity exposure |
| Clean-only | 0 ppm | 1152 | 669 |
| Clean-only | 200 ppm | 1286 | 1012 |
| Clean + Zr pretreat | 0 ppm | 1301 | 922 |
| Clean + Zr pretreat | 200 ppm | 1196 | 294 |

EXAMPLE 2

Four cold rolled steel (CRS) panels were cleaned by spraying with a solution of Chemkleen 490MX, for two minutes at 120° F. After alkaline cleaning, the panels were rinsed thoroughly with deionized water. Two of the panels were immersed in a zirconium pretreatment solution for two minutes at 120° F. The zirconium pretreatment solution was prepared by diluting hexafluorozirconic acid with water to a zirconium concentration of 175 ppm (as zirconium) and adjusting the pH to 4.5 with dilute ammonia. The other two panels were immersed in a zirconium pretreatment solution with identical concentration, temperature and time as the first two panels, except that this zirconium pretreatment solution contained 25 ppm copper, added as copper(II) chloride dehydrate. After pretreatment in the zirconium pretreatment solution, all panels were immediately rinsed thoroughly with deionized water and then dried with a warm air blowoff. The panels were then electrocoated with Powercron CX-6000, an yttrium-containing cathodic electrocoat available from PPG Industries, according to the manufacturer's application instructions. The panels were subjected to the above-mentioned PATTI adhesion test, as well as a crosshatch adhesion test, based on ASTM D3359. The crosshatch results were rated on a scale of 0 to 10, where 0 indicates complete paint loss, and 10 indicates perfect adhesion. As in the previous example, the adhesion testing was performed both before and after humidity exposure. The results appear in Table II below.

TABLE II

| Pretreatment | Crosshatch Rating | | Average PATTI burst pressure, psi | |
|---|---|---|---|---|
| | Before humidity exposure | After humidity exposure | Before humidity exposure | After humidity exposure |
| Zr-based; no Cu | 10 | 0 | 1056 | 109 |
| Zr-based with added Cu | 10 | 10 | 1182 | 729 |

EXAMPLE 3

Cold rolled panels were pretreated as in Example 2, with half of the panels receiving a zirconium pretreatment with no copper, while the other half received a zirconium pretreatment containing 20 ppm copper. The panels were dried by placing them in an oven at 275° F. for approximately five minutes. The panels were subsequently electrocoated with one of either two cathodic electrocoat products; ED6280C, with no yttrium, or ED6550G, an yttrium-containing electrocoat. Both products are available from PPG Industries. Following the electrocoating, the panels were then coated with a three-layer automotive coating: primer HP77-8554R, basecoat EVH 8554R, and clearcoat TKS-1050AR, all available from PPG Industries. Following the coating processes, panels were subjected to condensing humidity testing in which the panels were crosshatched and tested before and after humidity exposure, as detailed in example 2, except that the humidity exposure time was 24 hours. The panels were also subjected to a water soak test in which the panels were crosshatched by cutting through the coating system down to metal with eleven vertical and eleven horizontal cuts, spaced 2 millimeters apart, to give a grid of 100 squares each one square millimeter in area. The panels were soaked in water at 40° C. for ten days. At the end of the test the panels were rated by counting the number of squares still intact. Results appear in Table III.

TABLE III

| Pretreatment | Yttrium in electrocoat | 240 hr Water Soak Rating | Crosshatch Rating | |
|---|---|---|---|---|
| | | | Before humidity exposure | After humidity exposure |
| Zr-based; no Cu | No | 99 | 10 | 10 |
| Zr-based; no Cu | Yes | 0 | 10 | 0 |
| Zr-based with added Cu | No | 99 | 10 | 10 |
| Zr-based with added Cu | Yes | 99 | 10 | 10 |

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A method for coating a metal substrate, comprising:
   (a) contacting at least a portion of the metal substrate with a pretreatment composition comprising:
      (i) a source of a group IIIB metal and/or a group IVB metal,
      (ii) a source of copper; and
   wherein the total amount of elemental copper in the coating composition ranges from 1 to 5,000 ppm based on the total weight of the ingredients in the pretreatment composition;
   (b) after step (a), contacting at least a portion of the metal substrate with an electrodepositable coating composition comprising:
      (i) a film-forming resin, and
      (ii) a source of yttrium.

2. The method of claim 1, wherein the metal substrate is selected from the group consisting of cold rolled steel, hot rolled steel, electrogalvanized steel, hot-dipped galvanized steel, galvanealed steel, steel plated with zinc alloy, aluminum alloy, aluminum plated steel, aluminum alloy plated steel, and magnesium or an alloy thereof.

3. The method of claim 1, wherein the pretreatment composition comprises a carrier comprising an aqueous medium.

4. The method of claim 1, wherein the source of the group IIIB metal and/or a group IVB metal comprises a group IIIB and/or IVB metal compound that is a compound of zirconium, titanium, hafnium, yttrium, cerium, or a mixture thereof.

5. The method of claim 4, wherein the compound of zirconium is hexafluorozirconic acid.

6. The method of claim 1, wherein the group IIIB metal and/or the group IVB metal is present in the pretreatment composition in an amount of 10 to 5000 parts per million metal, based on the total weight of the ingredients in the composition.

7. The method of claim 1, wherein the source of copper in the pretreatment composition is a water soluble copper compound.

8. The method of claim 1, wherein the method does not include the step of depositing a phosphate film.

9. The method of claim 1, wherein the contacting step (b) comprises an electrocoating step wherein the electrodepositable composition is deposited onto the metal substrate by electrodeposition.

10. The method of claim 9, wherein the electrodepositable composition comprises a resinous phase dispersed in an aqueous medium wherein the resinous phase comprises: (a) an active hydrogen group-containing cationic electrodepositable resin, and (b) a curing agent having functional groups reactive with the active hydrogen groups of (a).

11. The method of claim 1, wherein the yttrium is present in the composition contacted with the substrate in step (b) in an amount from 10 to 10,000 parts per million of total yttrium measured as elemental yttrium, based on the total weight of the ingredients in the composition.

12. The method of claim 1, wherein the composition contacted with the substrate in step (b) is substantially free of lead.

13. The method of claim 1, wherein the source of yttrium is selected from the group consisting of yttrium acetate, yttrium chloride, yttrium formate, yttrium carbonate, yttrium sulfamate, yttrium lactate, yttrium nitrate, yttrium oxide, yttrium bromide, yttrium hydroxide, yttrium molybdate, yttrium sulfate, yttrium silicate, yttrium oxalate, and a mixture thereof.

* * * * *